US011660849B2

(12) United States Patent
Matsunaga et al.

(10) Patent No.: US 11,660,849 B2
(45) Date of Patent: May 30, 2023

(54) JOINED BODY MANUFACTURING APPARATUS

(71) Applicant: HONDA MOTOR CO., LTD., Tokyo (JP)

(72) Inventors: Kazuki Matsunaga, Tokyo (JP); Toru Ikeda, Tokyo (JP); Nobuyoshi Muromoto, Tokyo (JP); Shinsuke Chokyu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/832,154

(22) Filed: Jun. 3, 2022

(65) Prior Publication Data

US 2022/0396062 A1 Dec. 15, 2022

(30) Foreign Application Priority Data

Jun. 10, 2021 (JP) ............................. JP2021-097187

(51) Int. Cl.

*B32B 37/00* (2006.01)
*B32B 38/18* (2006.01)
*B32B 38/10* (2006.01)

(52) U.S. Cl.

CPC .......... *B32B 37/0053* (2013.01); *B32B 38/10* (2013.01); *B32B 38/1858* (2013.01)

(58) Field of Classification Search

CPC ............ B32B 2457/18; B32B 37/0053; B32B 37/025; B32B 38/10; B32B 38/1858; Y02P 70/50; Y02E 60/50

See application file for complete search history.

(56) References Cited

U.S. PATENT DOCUMENTS

2018/0375138 A1 12/2018 Nakatsuka et al.

FOREIGN PATENT DOCUMENTS

JP 2006-044658 A 2/2006
JP 2019-008995 A 1/2019

OTHER PUBLICATIONS

English translation of JP2018041687.*
English translation of JP2017062983.*
English translation of JP2020017374.*

* cited by examiner

*Primary Examiner* — Sonya M Sengupta

(74) *Attorney, Agent, or Firm* — Carrier Shende & Associates, P.C.; Joseph P. Carrier; Fulchand P. Shende

(57) ABSTRACT

A roll conveying unit of a joined body manufacturing apparatus includes a rotating unit and a suction unit. The outer peripheral surface of the rotating unit includes a contact suction portion that makes contact with a first back surface. The rotating unit rotates while bringing the contact suction portion into contact with the first back surface. The suction unit suctions the second layer from the contact suction portion through pores of the first layer, to thereby form a suctioned portion attracted to the contact suction portion under suction, in a laminated body of the first layer and the second layer. The peeling unit peels the coating film from the second back surface of the suctioned portion of the film-attached joined body.

9 Claims, 9 Drawing Sheets

JOINED BODY MANUFACTURING APPARATUS

CROSS-REFERENCE TO RELATED APPLICATIONS

This application is based upon and claims the benefit of priority from Japanese Patent Application No. 2021-097187 filed on Jun. 10, 2021, the contents of which are incorporated herein by reference.

BACKGROUND OF THE INVENTION

Field of the Invention

The present invention relates to a joined body manufacturing apparatus and a joined body manufacturing method.

Description of the Related Art

For example, JP 2019-008995 A proposes an apparatus for manufacturing a membrane electrode assembly for a fuel cell by joining a porous electrode and a non-porous electrolyte membrane.

SUMMARY OF THE INVENTION

When the porous first layer and the non-porous second layer are joined to each other to obtain a joined body as described above, it is necessary to increase the manufacturing efficiency of the joined body. As such, it is conceivable that the first joined surface of the first layer and the second joined surface of the second layer are continuously joined while conveying the first layer and the second layer, by a roll conveying unit. In this case, for example, for the purpose of protecting the second layer, the second layer is supplied to the roll conveying unit with a coating film being peelably attached to the back surface, which is a surface opposite to the second joined surface. The coating film temporarily protects the second layer and is not a constituent element of the joined body. Therefore, the coating film is peeled off from the second layer after the first joined surface and the second joined surface have been joined to each other.

However, when the coating film is peeled off from the second layer, the coating film pulls the second layer in a direction away from the first layer, and as a result, forces act on the first joined surface and the second joined surface in directions away from each other. When these forces exceed the joining force of the first joined surface and the second joined surface, for example, there is a concern that the first joined surface and the second joined surface may separate from each other, resulting in deteriorated quality of the joined body.

An object of the present invention is to solve the aforementioned problem.

According to an aspect of the present invention, there is provided a joined body manufacturing apparatus for manufacturing a joined body from a first layer that is porous and a second layer that is non-porous, wherein the first layer includes a first joined surface and a first back surface which is a surface opposite to the first joined surface, the second layer includes a second joined surface and a second back surface which is a surface opposite to the second joined surface, and a coating film is peelably attached to the second back surface, the joined body manufacturing apparatus including: a roll conveying unit configured to continuously join the first joined surface and the second joined surface in a laminated state while conveying the first layer and the second layer, to form a film-attached joined body; and a peeling unit configured to peel the coating film from the second back surface of the film-attached joined body to obtain the joined body, wherein the roll transport unit includes a rotating unit and a suction unit, an outer peripheral surface of the rotating unit includes a contact suction portion configured to make contact with the first back surface, the rotating unit rotates while bringing the contact suction portion into contact with the first back surface, the suction unit suctions the second layer from the contact suction portion through pores of the first layer, to thereby form a suctioned portion attracted to the contact suction portion under suction, in a laminated body of the first layer and the second layer, and the peeling unit peels the coating film from the second back surface of the suctioned portion of the film-attached joined body.

According to another aspect of the present invention, there is provided a joined body manufacturing method for manufacturing a joined body from a first layer that is porous and a second layer that is non-porous, wherein the first layer includes a first joined surface and a first back surface which is a surface opposite to the first joined surface, the second layer includes a second joined surface and a second back surface which is a surface opposite to the second joined surface, and a coating film is peelably attached to the second back surface, wherein the joined body manufacturing method uses a roll conveying unit to continuously join the first joined surface and the second joined surface in a laminated state while conveying the first layer and the second layer, to form a film-attached joined body, and thereafter peel the coating film from the second back surface of the film-attached joined body to manufacture the joined body, and wherein the roll transport unit includes a rotating unit that rotates, the joined body manufacturing method including: rotating the rotating unit while bringing a contact suction portion of an outer peripheral surface of the rotating unit into contact with the first back surface of a laminated body of the first layer and the second layer; with a suction unit that suctions the second layer from the contact suction portion through pores of the first layer, forming a suctioned portion attracted to the contact suction portion under suction, in the laminated body of the first layer and the second layer; and with a peeling unit, peeling the coating film from the second back surface of the suctioned portion of the film-attached joined body.

In the present invention, the first joined surface and the second joined surface in a laminated state are continuously joined to each other in the middle of conveying the first layer and the second layer by the roll conveying unit, thereby obtaining the film-attached joined body. The coating film is peeled off from the second back surface of the film-attached joined body to manufacture the joined body. Therefore, it is possible to efficiently manufacture the joined body while protecting the second layer by the coating film.

In addition, the rotating unit of the roll conveying unit rotates while bringing the contact suction portion into contact with the first back surface. The suction unit suctions the second layer from the contact suction portion through the pores of the first layer. As a result, a suctioned portion attracted to the contact suction portion under suction is formed in the laminated body of the first layer and the second layer. That is, in the suctioned portion, the second joined surface of the second layer is pressed against the first joined surface of the first layer by the suction force of the suction unit.

The peeling unit peels the coating film from the second back surface of the suctioned portion to obtain a joined body. In this case, even when the coating film is peeled off from the second back surface and consequently the coating film pulls the second layer in a direction to separate away from the first layer, peeling between the first joined surface and the second joined surface can be suppressed. As a result, it is possible to obtain a high-quality joined body in which the first joined surface and the second joined surface are suitably joined. Therefore, according to the present invention, a high-quality joined body can be efficiently manufactured.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
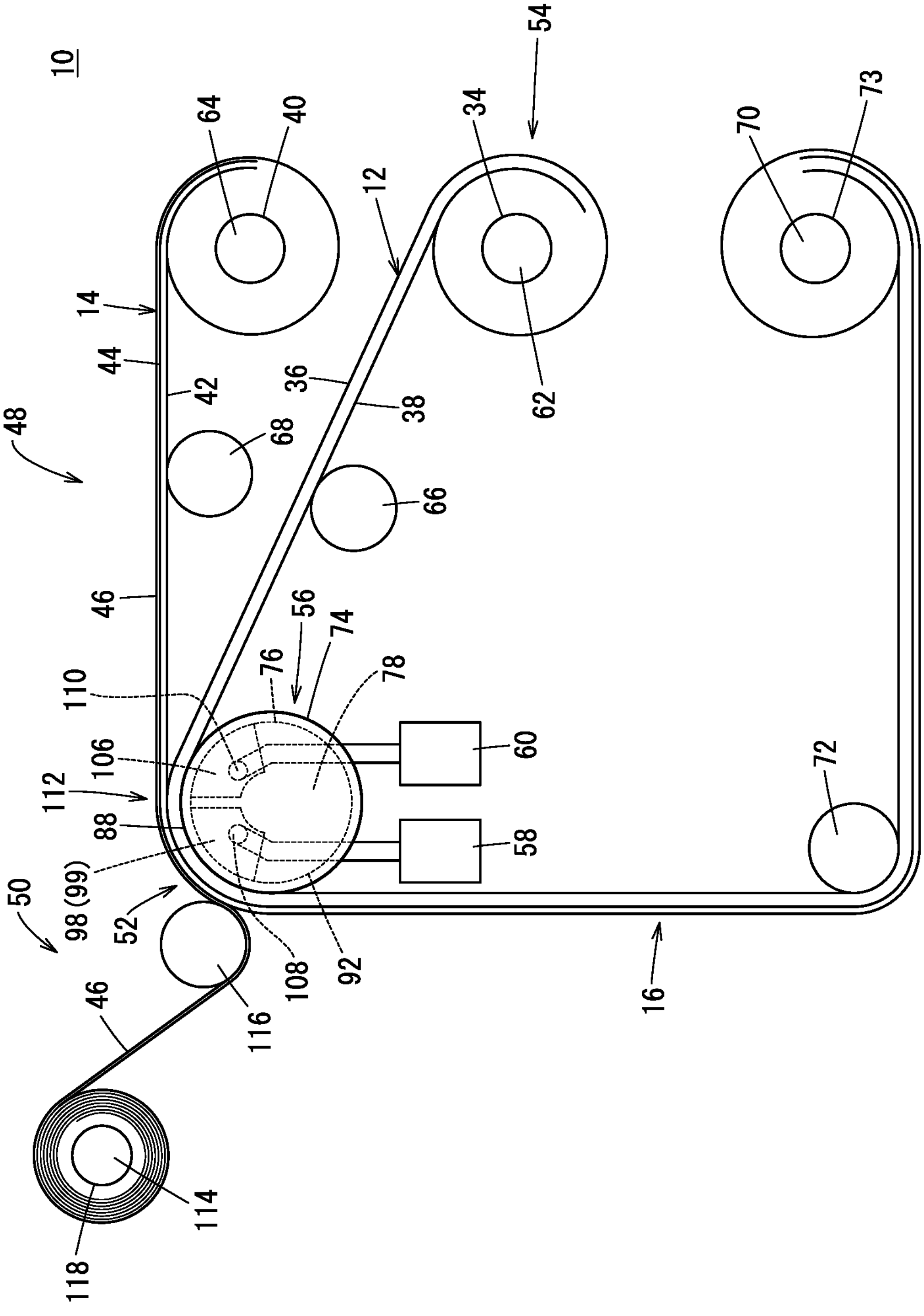
FIG. 1 is a schematic configuration diagram of a joined body manufacturing apparatus according to an embodiment of the present invention.

In the following drawings, components having the same or similar functions and effects are denoted by the same reference numerals, and repeated description thereof may be omitted.

A joined body manufacturing apparatus 10 according to the present embodiment shown in FIG. 1 manufactures a joined body 16 from a porous first layer 12 and a non-porous second layer 14. Suitable examples of the first layer 12 include materials for an anode 18 or a cathode 20 in FIG. 4B, which constitute solid polymer electrolyte fuel cells not shown. A preferable example of the second layer 14 includes a material for an electrolyte membrane 22 in FIG. 4B. Therefore, an embodiment in which the first layer 12 is a material for the anode 18 and the second layer 14 is a material for the electrolyte membrane 22 will be described below.

However, the first layer 12 is not limited to the material for the anode 18. For example, the first layer 12 may be the material for the cathode 20. Further, the first layer 12 may not be a component of the solid polymer electrolyte fuel cell. As the first layer 12, various porous structures can be adopted. The term "porous" as used herein refers to having breathability (air permeability) as a result of having a plurality of pores. The second layer 14 is not limited to the material for the electrolyte membrane 22. As the second layer 14, various non-porous structures can be adopted. The term "non-porous" as used herein means having no breathability or having breathability lower than the breathability of the first layer 12.

Figure 4A:
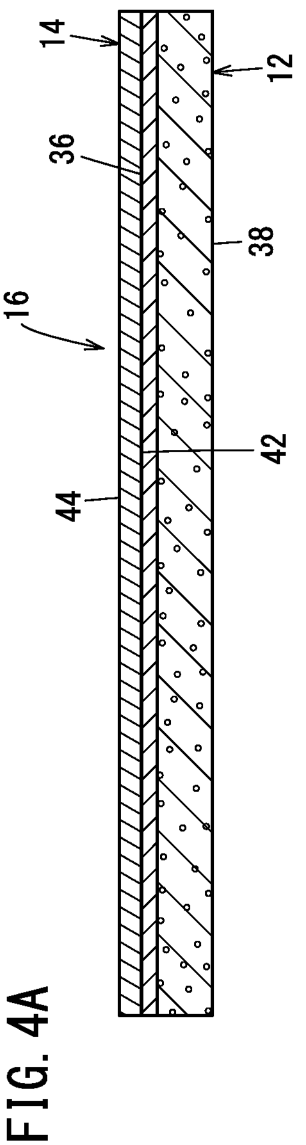
FIG. 4A is a schematic cross-sectional view of a joined body manufactured by the joined body manufacturing apparatus of FIG. 1.
Figure 4B:
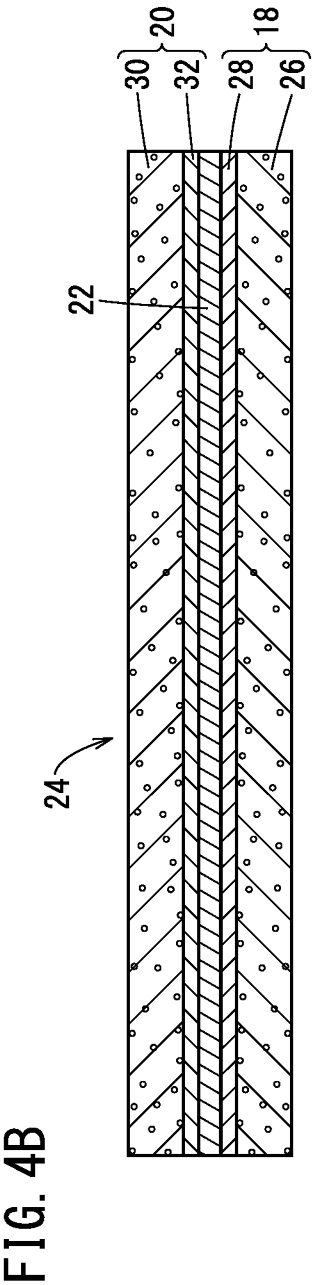
FIG. 4B is a schematic cross-sectional view of a membrane electrode assembly including the joined body of FIG. 4A.

As shown in FIG. 4B, the joined body 16 of FIG. 4A is joined to the material for the cathode 20, to form a membrane electrode assembly 24. The membrane electrode assembly 24 is sandwiched between separators (not shown) to form a power generation cell (unit fuel cell). In general, a plurality of power generation cells are stacked together, to form a fuel cell stack. The fuel cell stack can be mounted on, for example, a fuel cell vehicle such as a fuel cell electric vehicle. Note that the fuel cell stack may be mounted on a mounting body other than the fuel cell vehicle. Further, the fuel cell stack may be used in as a stationary type.

As shown in FIG. 4B, the electrolyte membrane 22 is, for example, a solid polymer electrolyte membrane (cation exchange membrane) such as a thin membrane of perfluorosulfonic acid containing water. In the present embodiment, the electrolyte membrane 22 is made of ionomer. In the membrane electrode assembly 24, the electrolyte membrane 22 is sandwiched between the anode 18 and the cathode 20. As the electrolyte membrane 22, an HC (hydrocarbon) based electrolyte may be used in addition to the fluorine-based electrolyte.

The anode 18 includes a porous anode gas diffusion layer 26 and a porous anode catalyst layer 28. An anode catalyst layer 28 is joined to one surface of the anode gas diffusion layer 26 in a laminated state. For example, porous carbon particles having a platinum alloy supported on the surface thereof are uniformly applied to the surface of the anode gas diffusion layer 26 together with an ion conductive polymer binder. Thus, the anode catalyst layer 28 can be formed on one surface of the anode gas diffusion layer 26. In the present embodiment, the material for the anode catalyst layer 28 includes an ionomer.

The cathode 20 includes a porous cathode gas diffusion layer 30 and a porous cathode catalyst layer 32. A cathode catalyst layer 32 is joined to one surface of the cathode gas diffusion layer 30 in a laminated state. For example, porous carbon particles having a platinum alloy supported on the surface thereof are uniformly applied to the surface of the cathode gas diffusion layer 30 together with an ion conductive polymer binder. Thus, the cathode catalyst layer 32 can be formed on one surface of the cathode gas diffusion layer 30. The cathode catalyst layer 32 is preferably formed of a material containing an ionomer.

Each of the cathode gas diffusion layer 30 and the anode gas diffusion layer 26 is formed of a conductive porous sheet such as carbon paper or carbon cloth. It is noted that a porous layer (not shown) may be provided at least one of between the cathode catalyst layer 32 and the cathode gas diffusion layer 30 and between the anode catalyst layer 28 and the anode gas diffusion layer 26.

As shown in FIG. 4A, the first layer 12, which is a material for the anode 18, and the second layer 14, which is a material for the electrolyte membrane 22, are joined to each other to obtain the joined body 16. By joining the joined body 16 and the material for the cathode 20, the membrane electrode assembly 24 is obtained as shown in FIG. 4B.

As shown in FIG. 1, the first layer 12 has, for example, a length that enables a plurality of anodes 18 to be formed, and is prepared in a state of being wound around a first winding core 34. The first layer 12 has a first joined surface 36 and a first back surface 38 that is a surface opposite to the first joined surface 36. The first joined surface 36 is a surface of the material for the anode catalyst layer 28. The first back surface 38 is a surface of the material for the anode gas diffusion layer 26.

The second layer 14 has, for example, a length capable of forming a plurality of electrolyte membranes 22, and is prepared in a state of being wound around a second winding core 40. In the present embodiment, the second layer 14 is softened by heating. The second layer 14 has a second joined surface 42 and a second back surface 44 that is a surface opposite to the second joined surface 42. A coating film 46 is peelably attached to the second back surface 44. In the present embodiment, the coating film 46 has a film shape that continuously covers the entire second back surface 44. The coating film 46 is formed of, for example, a resin having flexibility.

The coating film 46 is not a constituent element of the joined body 16 or a constituent element of the membrane electrode assembly 24. The coating film 46 is attached to the second back surface 44 in order to protect the second layer 14 until the joined body 16 is formed from the second layer 14. Therefore, the coating film 46 is peeled off from the second back surface 44 after the second layer 14 has been joined to the first layer 12. In the second layer 14 wound around the second winding core 40, it is preferable that the second back surface 44 covered with the coating film 46 should face outward in the radial direction of the second winding core 40, for the purpose of protecting the second layer 14 suitably.

The joined body manufacturing apparatus 10 according to the present embodiment will be described with reference to FIGS. 1 to 3. As illustrated in FIG. 1, the joined body manufacturing apparatus 10 includes a roll conveying unit (roll feeding unit) 48 and a peeling unit 50. The roll conveying unit 48 continuously joins the first joined surface 36 and the second joined surface 42 that are in a laminated state while conveying the first layer 12 and the second layer 14, to form a film-attached joined body 52. That is, the coating film 46 is attached to the second back surface 44 of the film-attached joined body 52. The peeling unit 50 peels the coating film 46 from the second back surface 44 of the film-attached joined body 52 to obtain the joined body 16.

Specifically, the roll conveying unit 48 includes a conveying mechanism (feeding mechanism) 54, a rotating unit 56, a suction unit 58, and a heating unit 60. The conveying mechanism 54 includes a first unwinding roller 62, a second unwinding roller 64, a first guide roller 66, a second guide roller 68, a joined body take-up roller 70, and a third guide roller 72.

The first unwinding roller 62 rotatably supports the first winding core 34. When the first unwinding roller 62 rotates, the first layer 12 is fed from the first winding core 34 toward the rotating unit 56. In the present embodiment, the first layer 12 is fed toward the rotating unit 56 with the first joined surface 36 facing upward and the first back surface 38 facing downward. The second unwinding roller 64 rotatably supports the second winding core 40. When the second unwinding roller 64 rotates, the second layer 14 is fed from the second winding core 40 toward the rotating unit 56. In the present embodiment, the second layer 14 is fed to the rotating unit 56 in a state in which the second joined surface 42 faces downward and the second back surface 44 covered with the coating film 46 faces upward.

The first guide roller 66 is interposed between the first unwinding roller 62 and the rotating unit 56, and guides conveyance of the first layer 12. The second guide roller 68 is interposed between the second unwinding roller 64 and the rotating unit 56 and guides conveyance of the second layer 14.

The joined body take-up roller 70 rotatably supports a third winding core 73. When the joined body take-up roller 70 rotates, the joined body 16 obtained via the rotating unit 56 and the peeling unit 50 is wound up around the third winding core 73. The third guide roller 72 is interposed between the rotating unit 56 and the joined body take-up roller 70 and guides conveyance of the joined body 16.

Figure 2:
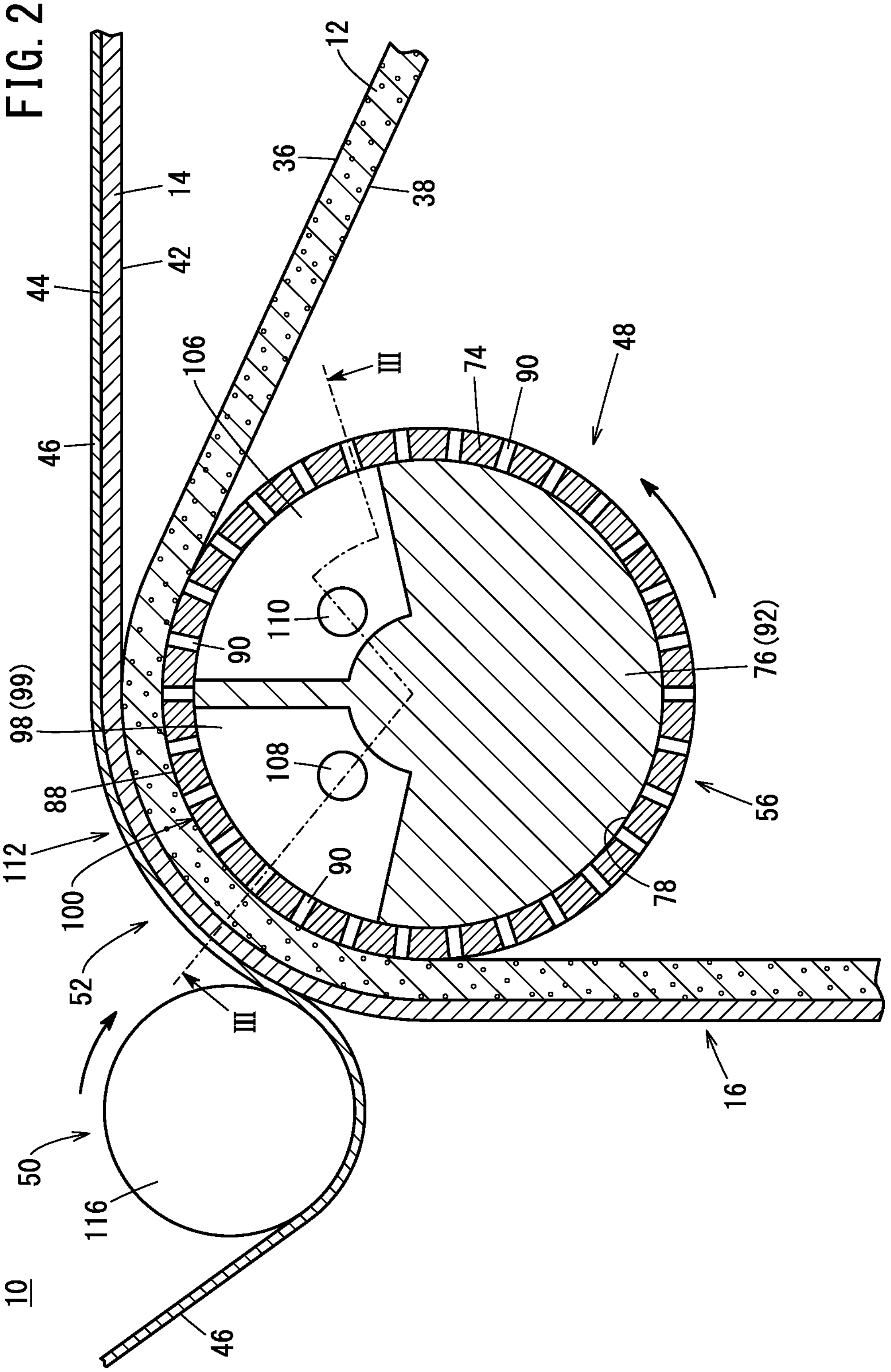
FIG. 2 is a cross-sectional view taken along a radial direction of a rotating unit of FIG. 1.
Figure 3:
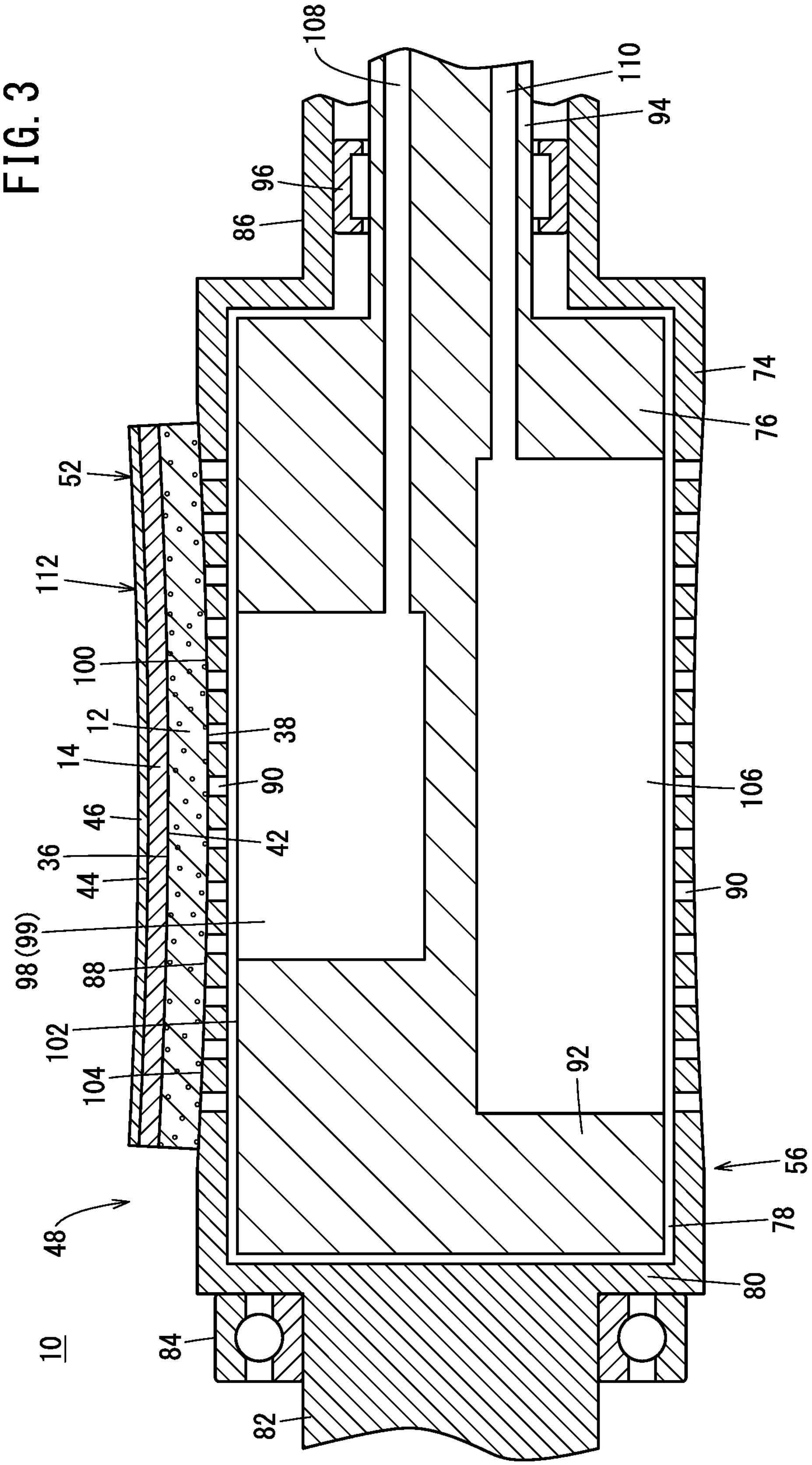
FIG. 3 is a cross-sectional view taken along line III-III of FIG. 2.

As shown in FIGS. 2 and 3, the rotating unit 56 includes a rotating unit main body 74 and a support shaft 76. As shown in FIG. 3, the rotating unit main body 74 has a substantially hollow cylindrical shape extending in the axial direction of the rotating unit main body 74. A hollow portion 78 is formed inside the rotating unit main body 74. One end face of the rotating unit main body 74 in the axial direction is closed by a closing portion 80. A shaft 82 that protrudes toward the outside of the rotating unit main body 74 is provided at the center of the closing portion 80 in the radial direction. The shaft 82 extends along the axial direction of the rotating unit main body 74. The shaft 82 is rotatably supported by a support mechanism (not shown) via a first bearing 84, for example.

A hollow cylindrical protruding portion 86 is provided at the other end of the rotating unit main body 74 in the axial direction. The outer diameter of the protruding portion 86 is smaller than the outer diameter of the rotating unit main body 74. The inner diameter of the protruding portion 86 is smaller than the inner diameter of the rotating unit main body 74. The inside of the protruding portion 86 communicates with the hollow portion 78.

The outer peripheral surface of the rotating unit main body 74 has a contact suction portion 88. During conveyance of the first layer 12 and the second layer 14 by the roll conveying unit 48 of FIG. 1, the rotating unit main body 74 rotates while bringing the contact suction portion 88 into contact with the first back surface 38. In other words, when the outer peripheral surface of the rotating unit main body 74 that is rotating passes through a position where the outer peripheral surface of the rotating unit main body 74 comes into contact with the first back surface 38, the outer peripheral surface of the rotating unit main body 74 constitutes the contact suction portion 88.

As shown in FIG. 3, in the rotating unit main body 74, the outer diameter of a center portion of the contact suction portion 88 in the axial direction is smaller than the outer diameter of both end portions of the contact suction portion 88 in the axial direction. Therefore, when viewed along the radial direction of the rotating unit 56, the contact suction portion 88 is curved in a direction in which the center portion of the contact suction portion 88 is recessed relative to the both end portions of the contact suction portion 88 in the axial direction.

The rotating unit main body 74 has a plurality of through holes 90 that allow the inside and the outside of the hollow portion 78 to communicate with each other. The number and shape of the through holes 90 are not particularly limited. In the present embodiment, the through holes 90 are formed throughout the rotating unit main body 74 in the circumferential direction. The through holes 90 are formed in the entire contact suction portion 88 in the axial direction.

The support shaft 76 rotatably supports the rotating unit main body 74. The rotating unit main body 74 may be rotationally driven by a motor or the like (not shown). For example, the rotating unit main body 74 may rotate by coming into contact with the first back surface 38 of the first layer 12 conveyed by the conveying mechanism 54.

The support shaft 76 has an insertion portion 92 disposed inside the hollow portion 78 of the rotating unit main body 74. The insertion portion 92 extends along the axial direction of the rotating unit main body 74. The support shaft 76 is supported by a support mechanism (not shown) in a non-rotating state. The insertion portion 92 is provided at one end portion of the support shaft 76 in the extending direction. The support shaft 76 has a small-diameter portion 94 extending from the insertion portion 92. The small-diameter portion 94 is disposed inside the protruding portion 86 of the rotating unit main body 74. The outer diameter of the small-diameter portion 94 is smaller than the inner diameter of the protruding portion 86. A second bearing 96 is provided between the outer peripheral surface of the small-diameter portion 94 and the inner peripheral surface of the protruding portion 86. Accordingly, the rotating unit main body 74 is rotatably supported by the support shaft 76.

The insertion portion 92 has a suction chamber 98 at a portion facing from the inside of the hollow portion 78 toward the contact suction portion 88. The suction chamber 98 has a shape obtained by cutting out a portion of the insertion portion 92 in a direction from the radially outer side toward the center of the insertion portion 92. The suction chamber 98 communicates with the through holes 90 formed in the axial central portion (which is a communication region 100 described later) of the contact suction portion 88. A blocking portion 102 is provided outside each of both ends of the suction chamber 98 in the axial direction of the insertion portion 92. The outer diameter of the blocking portion 102 is set to be slightly smaller than the inner diameter of the rotating unit main body 74. Therefore, when the blocking portion 102 is disposed to face the through holes 90 provided in both axial end portions (i.e., non-communication regions 104 described later) of the contact suction portion 88, communication between the through holes 90 and the suction chamber 98 is blocked.

The insertion portion 92 has a heating chamber 106 separately from the suction chamber 98. As shown in FIG. 2, the heating chamber 106 is disposed at a position away from the suction chamber 98 in a direction opposite to the rotation direction of the rotating unit main body 74. The heating chamber 106 has a shape obtained by cutting out a portion of the insertion portion 92 in a direction from the radially outer side toward the center of the insertion portion 92. As shown in FIG. 3, the heating chamber 106 communicates with all the through holes 90 arranged from end to end in the axial direction of the rotating unit main body 74. Therefore, the length of the heating chamber 106 in the axial direction of the insertion portion 92 is longer than the length of the suction chamber 98 in the axial direction of the insertion portion 92.

The support shaft 76 further includes a suction path 108 and a hot air supply path 110. The suction path 108 extends from the suction chamber 98 through the inside of the small-diameter portion 94. Further, as shown in FIG. 1, an end portion of the suction path 108 opposite to the suction chamber 98 is connected to a suction unit 58 disposed outside the support shaft 76. That is, the suction path 108 allows the suction chamber 98 and the suction unit 58 to communicate with each other. As shown in FIG. 3, the hot air supply path 110 extends from the heating chamber 106 through the inside of the small-diameter portion 94. Further, as shown in FIG. 1, an end portion of the hot air supply path 110 opposite to the heating chamber 106 is connected to a heating unit 60 disposed outside the support shaft 76. That is, the hot air supply path 110 allows the heating chamber 106 and the heating unit 60 to communicate with each other.

As shown in FIG. 1, when the first layer 12 and the second layer 14 respectively conveyed by the conveying mechanism 54 reach the contact suction portion 88 of the rotating unit 56, the first layer 12 and the second layer 14 are in a state of a laminated body in which the first joined surface 36 and the second joined surface 42 are laminated. As shown in FIGS. 2 and 3, the suction unit 58 suctions the second layer 14 from the contact suction portion 88 through the pores of the first layer 12, whereby a suctioned portion 112 attracted to the contact suction portion 88 under suction is formed in the laminated body of the first layer 12 and the second layer 14.

Specifically, the suction unit 58 suctions the suction chamber 98 via the suction path 108 to create a negative pressure in the suction chamber. That is, the suction unit 58 generates a negative-pressure portion 99 in the suction chamber 98 inside the hollow portion 78. As a result, in the contact suction portion 88, the laminated body is suctioned through the through holes 90 communicating with the negative-pressure portion 99 to form the suctioned portion 112. As the suction unit 58, for example, a known configuration such as a suction pump can be used.

In the suctioned portion 112, the second layer 14 is attracted to the contact suction portion 88 with the first layer 12 interposed therebetween, by the suction force of the suction unit 58. Therefore, in the suctioned portion 112, the second joined surface 42 of the second layer 14 is pressed against the first joined surface 36 of the first layer 12. Thus, the film-attached joined body 52 is formed by joining the first joined surface 36 and the second joined surface 42 with the pressurizing force being applied in the direction of approaching each other. In the joined body manufacturing apparatus 10, the joining between the first joined surface 36 and the second joined surface 42 is performed mainly using the suction force of the suction unit 58. In this case, it is possible to prevent a load applied to the first layer 12 and the second layer 14 from increasing more than necessary when the first joined surface 36 and the second joined surface 42 are joined. Therefore, for example, it is possible to form the film-attached joined body 52 while reducing a load on fibers or the like included in the material for the anode gas diffusion layer 26 of the first layer 12.

As described above, the suction chamber 98 communicates with the through holes 90 formed in the axial central portion of the contact suction portion 88. However, the suction chamber 98 does not communicate with the through holes 90 formed in both axial end portions of the contact suction portion 88. Therefore, in the contact suction portion 88, a communication region 100 that communicates with the negative-pressure portion 99 via the through holes 90 and a non-communication region 104 that does not communicate with the negative-pressure portion 99 are formed. The first back surface 38 of the suctioned portion 112 is in contact with both the communication region 100 and the non-communication region 104.

The plurality of pores of the first layer 12 communicate with each other in various directions including the thickness direction and the width direction of the first layer 12. Therefore, when negative pressure is created in the suction chamber 98 by the suction unit 58, the entire second layer 14 laminated on the first layer 12 is attracted to the contact suction portion 88 through the through holes 90 of the communication region 100 and the pores of the first layer 12.

As a result, the suctioned portion 112 comes into contact with the entire contact suction portion 88 including the non-communication region 104. Further, in the suctioned portion 112, the entire second joined surface 42 is pressed against the first joined surface 36.

Here, in the film-attached joined body 52 constituted by a plurality of layers, the central portion of the first back surface 38 in the width direction tends to be easily curved in a direction protruding relative to both end portions of the first back surface in the width direction. In other words, the film-attached joined body 52 tends to be easily curved in a direction in which the central portion of the first joined surface 36 in the width direction is recessed relative to both end portions thereof in the width direction. Therefore, since the contact suction portion 88 is curved as described above, the first back surface 38 can be brought into contact with the contact suction portion 88 suitably. Accordingly, the suction force of the suction unit 58 can be favorably transmitted to the suctioned portion 112. As a result, it is possible to maintain a state in which the second joined surface 42 of the suctioned portion 112 is favorably pressed against the first joined surface 36.

The heating unit 60 heats and softens the second layer 14 before the first joined surface 36 and the second joined surface 42 are joined. That is, the first layer 12 and the second layer 14 being conveyed by the conveying mechanism 54 reach a position where heating is performed by the heating unit 60, before reaching the contact suction portion 88. In the present embodiment, at the time when the first layer 12 conveyed by the conveying mechanism 54 reaches the position where heating is performed by the heating unit 60, the second layer 14 is not laminated on the first layer 12.

The heating unit 60 supplies hot air to the heating chamber 106 via the hot air supply path 110. The hot air supplied to the heating chamber 106 by the heating unit 60 is discharged from the heating chamber 106 through the through holes 90. The hot air discharged from the heating chamber 106 through the through holes 90 heats the second layer 14 through the pores of the first layer 12. As described above, the heating chamber 106 communicates with all the through holes 90 arranged from end to end in the axial direction of the rotating unit main body 74. Therefore, it is possible to satisfactorily heat and soften the second layer 14 using the entire portion of the rotating unit main body 74 extending in the axial direction.

That is, in the joined body manufacturing apparatus 10, the second layer 14 softened by the heating unit 60 can be delivered to the contact suction portion 88. As described above, in the present embodiment, both the first joined surface 36 and the second joined surface 42 contain an ionomer. Therefore, the softened second joined surface 42 can be easily mixed with the first joined surface 36 in the contact suction portion 88. In addition, the softened second layer 14 can easily enter the uneven structure of the porous first joined surface 36.

Accordingly, in the contact suction portion 88, the first layer 12 and the second layer 14 can be quickly joined to each other. In addition, since an anchor effect can be generated between the first joined surface 36 and the second joined surface 42 which are joined to each other, the first layer 12 and the second layer 14 can be joined to each other with high strength.

Hot air supplied to the heating chamber 106 by the heating unit 60 may be any gas, so long as it has a temperature capable of softening the second layer 14 (having a temperature equal to or higher than the glass transition point). Examples of hot air include heated air, heated inert gas and the like. For the purpose of quickly and stably joining the first joined surface 36 and the second joined surface 42, the hot air is preferably humidified. Further, the hot air may be water vapor.

The peeling unit 50 peels the coating film 46 from the second back surface 44 of the suctioned portion 112 of the film-attached joined body 52. Specifically, the peeling unit 50 includes a coating film take-up roller 114 and a guide member 116. The coating film take-up roller 114 rotatably supports a fourth winding core 118. When the coating film take-up roller 114 rotates, the coating film 46 peeled off from the film-attached joined body 52 is wound around the fourth winding core 118.

The guide member 116 guides the coating film 46 from the rotating unit 56 toward the coating film take-up roller 114. Specifically, the guide member 116 is rotatably disposed at a position facing the suctioned portion 112 on a side opposite to the rotating unit 56. In other words, the film-attached joined body 52 is disposed between the contact suction portion 88 and the guide member 116.

In addition, the guide member 116 rotates in a direction opposite to the rotation direction of the rotating unit 56 in a state where the outer peripheral surface of the guide member 116 is in contact with the coating film 46. That is, the coating film 46 is maintained in a state of being attached to the second back surface 44 until reaching the contact suction portion 88 from the second unwinding roller 64. The coating film 46 that has reached the contact suction portion 88 comes into contact with the outer peripheral surface of the guide member 116, whereby the conveying direction of the coating film 46 is changed to a direction in which the coating film 46 is peeled off from the second back surface 44. The coating film 46 is then delivered toward the coating film take-up roller 114. Therefore, the peeling unit 50 peels the coating film 46 from the suctioned portion 112 in which the second joined surface 42 is pressed against the first joined surface 36 by the suction of the suction unit 58.

As described above, when the second layer 14 is heated by the heating unit 60, the coating film 46 attached to the second layer 14 is also heated. Therefore, the coating film 46 in a heated state is conveyed to the peeling unit 50. Since the coating film 46 is easily deformed due to being heated, the conveying direction can be changed within a larger range in the peeling unit 50. Such a coating film 46 can be easily peeled off from the second back surface 44.

As described above, the joined body 16 obtained in the peeling unit 50 is guided to the joined body take-up roller 70 by the third guide roller 72. Therefore, in the joined body manufacturing apparatus 10, it is possible to obtain the joined body 16 in a state of being wound around the joined body take-up roller 70.

Hereinafter, a joined body manufacturing method according to the present embodiment will be described by using, as an example, a case where the method is performed using the joined body manufacturing apparatus 10. In this joined body manufacturing method, first, conveyance (feeding) of the first layer 12 and the second layer 14 is started by the conveying mechanism 54. As a result, the first layer 12 is conveyed (fed) from the first winding core 34 toward the rotating unit 56. The second layer 14 is conveyed (fed) from the second winding core 40 toward the rotating unit 56.

Next, a heating step of heating and softening the second layer 14 that is being conveyed is performed. In the heating step, hot air is supplied to the heating chamber 106 by the heating unit 60. The hot air is discharged from the through holes 90 communicating with the heating chamber 106. Thus, the second layer 14 can be heated and softened through the pores of the first layer 12. Incidentally, in the heating step, it is preferable to heat and humidify the first layer 12 and the second layer 14 by, for example, supplying humidified hot air to the heating chamber 106.

Next, the first layer 12 and the second layer 14 being conveyed are laminated to form a laminated body. Next, the rotating unit 56 is rotated while the contact suction portion 88 of the rotating unit 56 is brought into contact with the first back surface 38 of the laminated body. Next, the second layer 14 is suctioned from the contact suction portion 88 through the pores of the first layer 12 by the suction unit 58. As a result, in the laminated body, the suctioned portion 112 attracted to the contact suction portion 88 under suction is formed. In the suctioned portion 112, the second joined surface 42 is pressed against the first joined surface 36. For this reason, the first joined surface 36 and the second joined surface 42 are joined to obtain the film-attached joined body 52.

Next, the coating film 46 is peeled off from the second back surface 44 of the suctioned portion 112 of the film-attached joined body 52 by the peeling unit 50. That is, the coating film 46 is peeled off from the film-attached joined body 52 in a state where the second joined surface 42 is pressed against the first joined surface 36 by the suction force of the suction unit 58, and the joined body 16 is then obtained. This joined body 16 is wound around the joined body take-up roller 70 via the third guide roller 72. The coating film 46 peeled off from the second back surface 44 is wound around the coating film take-up roller 114 via the guide member 116.

As described above, in the joined body manufacturing apparatus 10 and the joined body manufacturing method according to the present embodiment, while the first layer 12 and the second layer 14 are being conveyed by the roll conveying unit 48, the first joined surface 36 and the second joined surface 42 in a laminated state are continuously joined to obtain the film-attached joined body 52. The coating film 46 is peeled off from the second back surface 44 of the film-attached joined body 52 to manufacture the joined body 16. Therefore, it is possible to efficiently manufacture the joined body 16 while protecting the second layer 14 by the coating film 46.

The rotating unit 56 of the roll conveying unit 48 forms the suctioned portion 112 attracted to the contact suction portion 88 under suction, in the laminated body. In the suctioned portion 112, the second joined surface 42 is pressed against the first joined surface 36 by the suction force of the suction unit 58. The peeling unit 50 peels the coating film from the second back surface 44 of the suctioned portion 112 to obtain the joined body 16.

In this case, peeling of the first joined surface 36 and the second joined surface 42 can be suppressed even when, as a result of peeling off the coating film 46 from the second back surface 44, the coating film 46 pulls the second layer 14 in a direction in which the second layer 14 is separated away from the first layer 12. As a result, it is possible to obtain the high-quality joined body 16 in which the first joined surface 36 and the second joined surface 42 are suitably joined. Therefore, according to the joined body manufacturing apparatus 10 and the joining method according to this embodiment, it is possible to efficiently manufacture the joined body 16 having high quality.

In the above-described embodiment, the coating film 46 continuously covers the second back surface 44. The peeling unit 50 includes a guide member 116 rotatably disposed at a position facing the suctioned portion 112 on a side opposite to the rotating unit 56. The guide member 116 rotates in a direction opposite to the rotation direction of the rotating unit 56 in a state where the outer peripheral surface of the guide member 116 is in contact with the coating film 46. In this case, with a simple configuration in which the guide member 116 is provided as described above, it is possible to accurately peel the coating film 46 from the second back surface 44 of the suctioned portion 112 and obtain the high-quality joined body 16.

In the above-described embodiment, in the rotating unit 56, the outer diameter of the central portion of the contact suction portion 88 in the axial direction is smaller than the outer diameters of both end portions of the contact suction portion 88 in the axial direction. In the cross section along the axial direction of the rotating unit 56, the contact suction portion 88 is curved in a direction in which the central portion is recessed relative to the both end portions, of the contact suction portion 88 in the axial direction. In this case, as described above, the first back surface 38 can be brought into suitable contact with the contact suction portion 88, and the suction force by the suction unit 58 can be suitably transmitted to the suctioned portion 112. This makes it possible to maintain the suctioned portion 112 in a state in which the second joined surface 42 is pressed against the first joined surface 36. As a result, the first joined surface 36 and the second joined surface 42 can be suitably joined to each other. In addition, it is possible to peel off the coating film 46 while maintaining a state in which the first joined surface 36 and the second joined surface 42 are suitably joined to each other. Consequently, it is possible to efficiently obtain the high-quality joined body 16.

In the above-described embodiment, the rotating unit 56 includes the rotating unit main body 74 having an outer peripheral surface. A hollow portion 78 is formed inside the rotating unit main body 74. The rotating unit main body 74 has through holes 90 that allow the inside and the outside of the hollow portion 78 to communicate with each other. The suction unit 58 generates a negative-pressure portion 99 in at least a part of the hollow portion 78. The suction unit 58 forms a suctioned portion 112 by using the negative-pressure portion 99 and the through holes 90 communicating with the negative-pressure portion 99. In this case, a high-quality joined body 16 can be efficiently obtained, with a simple configuration in which the hollow portion 78 is suctioned by the suction unit 58.

In the above-described embodiment, the contact suction portion 88 of the rotating unit main body 74 includes the communication region 100 that communicates with the negative-pressure portion 99 via the through holes 90 and the non-communication region 104 that does not communicate with the negative-pressure portion 99. The non-communication region 104 is disposed outside each of both ends of the communication region 100 in the axial direction of the rotating unit main body 74. The first back surface 38 of the suctioned portion 112 is in contact with both the communication region 100 and the non-communication region 104.

Here, for example, when there exists a through hole 90 that is not sufficiently covered by the first back surface 38 in the communication region 100, a flow of gas occurs from the outside toward the inside of the negative-pressure portion 99 via the through hole 90, which does not contribute to the attracting of the suctioned portion 112 due to suction. In this case, there is a concern that the force of suctioning the suctioned portion 112 by the suction unit 58 may decrease. In the contact suction portion 88 of the present embodiment, since the non-communication region 104 is provided as described above, it is easy to cover the entire communication region 100 with the first back surface 38. Therefore, the suctioned portion 112 can be suitably attracted to the contact suction portion 88 due to suction. Thus, it is possible to obtain the joined body 16 in which the first joined surface 36 and the second joined surface 42 are suitably joined.

In the above-described embodiment, the through holes 90 are formed in both the communication region 100 and the non-communication region 104. The rotating unit 56 includes a support shaft 76 that rotatably supports the rotating unit main body 74. The support shaft 76 has an insertion portion 92 disposed inside the hollow portion 78. A portion of the insertion portion 92 that faces the communication region 100 forms a suction chamber 98 in the hollow portion 78. The suction unit 58 creates a negative pressure in the suction chamber 98 to generate the negative-pressure portion 99. A portion (blocking portion 102) of the insertion portion 92 that faces the non-communication region 104 blocks communication between the through holes 90 disposed in the non-communication region 104 and the suction chamber 98.

In this case, by forming the suction chamber 98 in the insertion portion 92, the negative-pressure portion 99 can be generated at a desired position in the hollow portion 78. Even if the through holes 90 are provided in the non-communication region 104, communication between the through holes 90 in the non-communication region 104 and the suction chamber 98 (negative-pressure portion 99) can be blocked by portions (blocking portion 102) of the insertion portion 92 other than the suction chamber 98. That is, the non-communication region 104 can be easily formed regardless of the presence or absence of the through holes 90. Therefore, for example, the communication region 100 and the non-communication region 104 can be arranged with high accuracy in accordance with at least one of the disposition of the contact suction portion 88 in the rotating unit 56 and the dimensions of the first layer 12 and the second layer 14. As a result, the suctioned portion 112 can be more favorably attracted to the contact suction portion 88 under suction, and thus it is possible to obtain the joined body 16 in which the first joined surface 36 and the second joined surface 42 are suitably joined.

In the above-described embodiment, the roll conveying unit 48 includes a heating unit 60 that heats and softens the second layer 14 before the first joined surface 36 and the second joined surface 42 are joined. The insertion portion 92 forms a heating chamber 106 in the hollow portion 78 separately from the suction chamber 98. The heating chamber 106 is disposed at a position separating away from the suction chamber 98 in a direction opposite to the rotation direction of the rotating unit main body 74. The heating unit 60 supplies hot air to the heating chamber 106. The hot air supplied to the heating chamber 106 is discharged from the heating chamber 106 through the through holes 90, to thereby heat the second layer 14 through the pores of the first layer 12.

In this case, it is possible to heat the second layer 14 in the rotating unit 56 by forming the heating chamber 106 in the insertion portion 92. For this reason, it is possible to obtain the joined body 16 in which the first joined surface 36 and the second joined surface 42 are suitably joined by heating the second layer 14 while suppressing an increase in size of the joined body manufacturing apparatus 10. In addition, the first joined surface 36 and the second joined surface 42 can be humidified by supplying humidified hot air to the heating chamber 106. Therefore, it is possible to obtain the joined body 16 in which the first joined surface 36 and the second joined surface 42 are favorably joined by humidifying the first joined surface 36 and the second joined surface 42 while suppressing an increase in size of the joined body manufacturing apparatus 10.

The present invention is not limited to the above-described embodiment, and various configurations can be adopted therein without departing from the essence and gist of the present invention.

Figure 5:
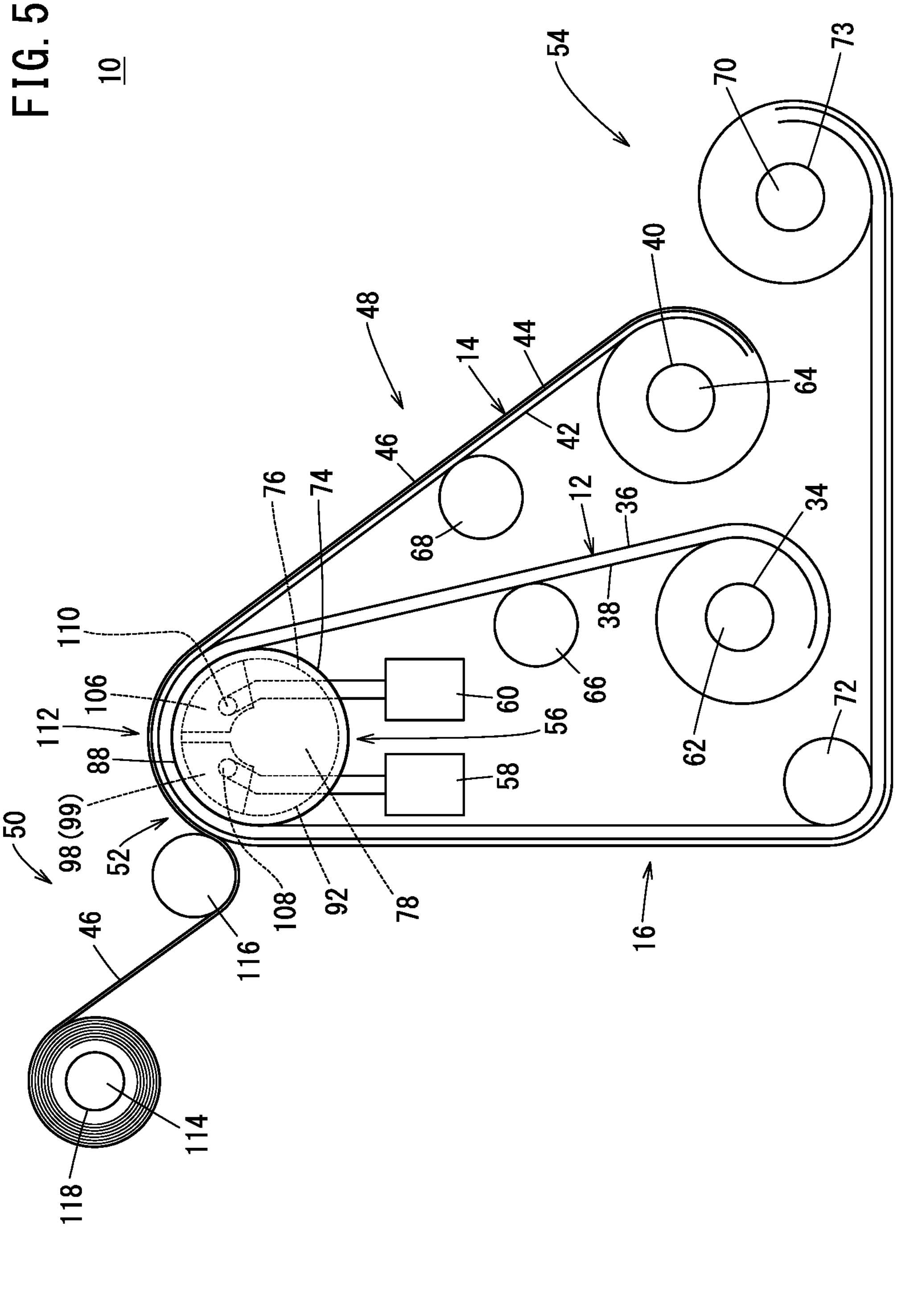
FIG. 5 is a schematic configuration diagram of a joined body manufacturing apparatus according to a modification.
Figure 6:
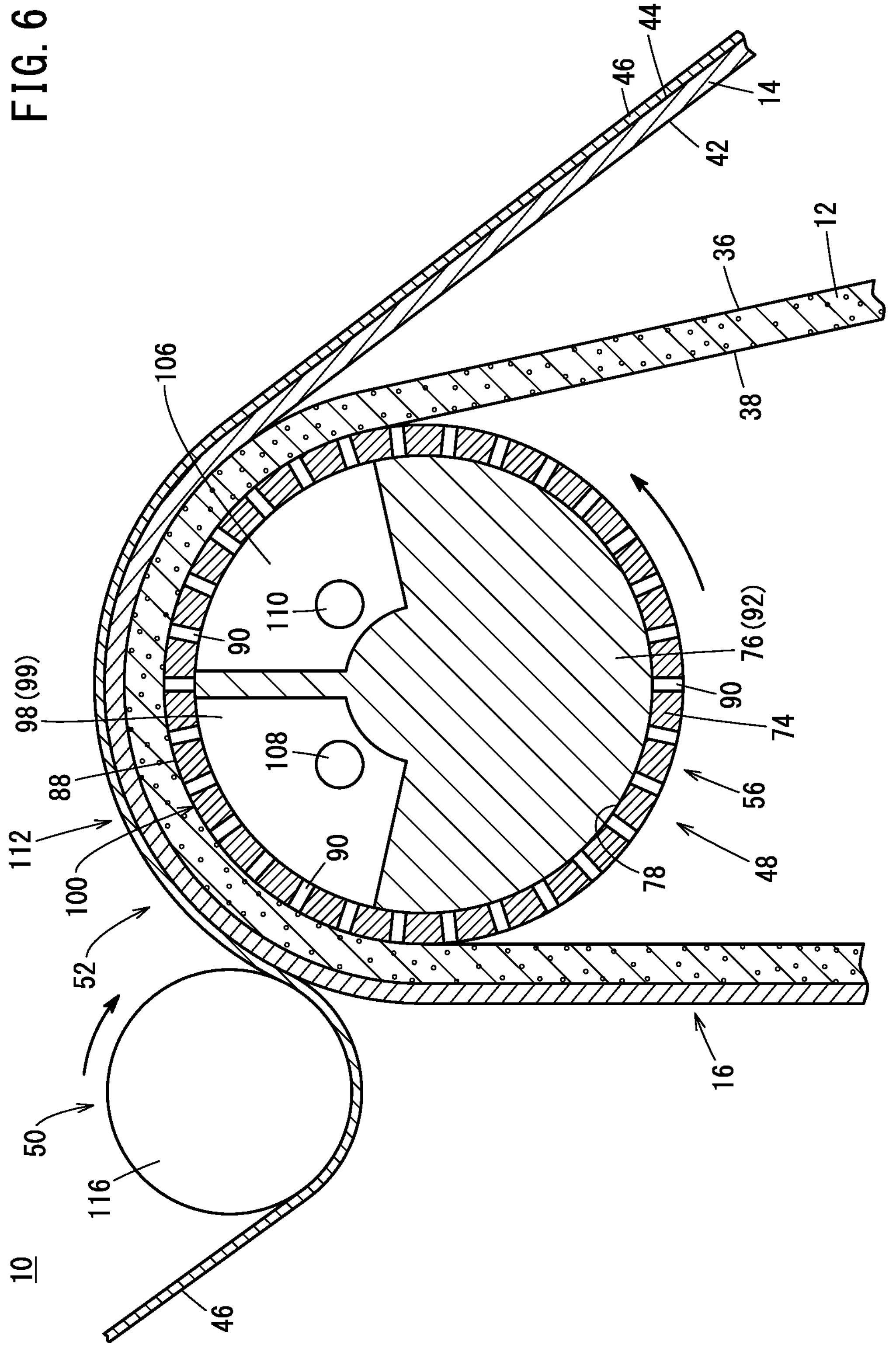
FIG. 6 is a cross-sectional view taken along the radial direction of a rotating unit of FIG. 5.

In the above-described embodiment, the second layer 14 is not laminated on the first layer 12 at the time when the first layer 12 conveyed by the conveying mechanism 54 has reached a position where heating is performed by the heating unit 60 (hereinafter also referred to as a heating position). However, for example, as illustrated in FIGS. 5 and 6, the first layer 12 may reach the heating position in a state in which the first layer 12 and the second layer 14 conveyed by the conveying mechanism 54 are laminated. For example, as shown in FIG. 5, the laminated body can be delivered to the heating position by adjusting the relative positions of the first unwinding roller 62, the first guide roller 66, the second unwinding roller 64, and the second guide roller 68 with respect to the rotating unit 56.

In the embodiment shown in FIGS. 5 and 6, the second layer 14 is disposed closer to the through holes 90 communicating with the heating chamber 106. Hot air can be supplied to the second layer 14 in this state, through the pores of the first layer 12. Therefore, the second layer 14 can be heated more efficiently.

In the above-described embodiment, the insertion portion 92 forms the heating chamber 106 in the hollow portion 78. However, the insertion portion 92 may not form the heating chamber 106. That is, although not illustrated, the insertion portion 92 may form only the suction chamber 98 in the hollow portion 78. In this case, the heating unit 60 may supply hot air to the second layer 14 before reaching the rotating unit 56, at a position between the rotating unit 56 and the second unwinding roller 64, for example. Note that the hot air is preferably humidified. The heating unit 60 may heat the second layer 14 by using a heater or the like, instead of supplying hot air.

Figure 7:
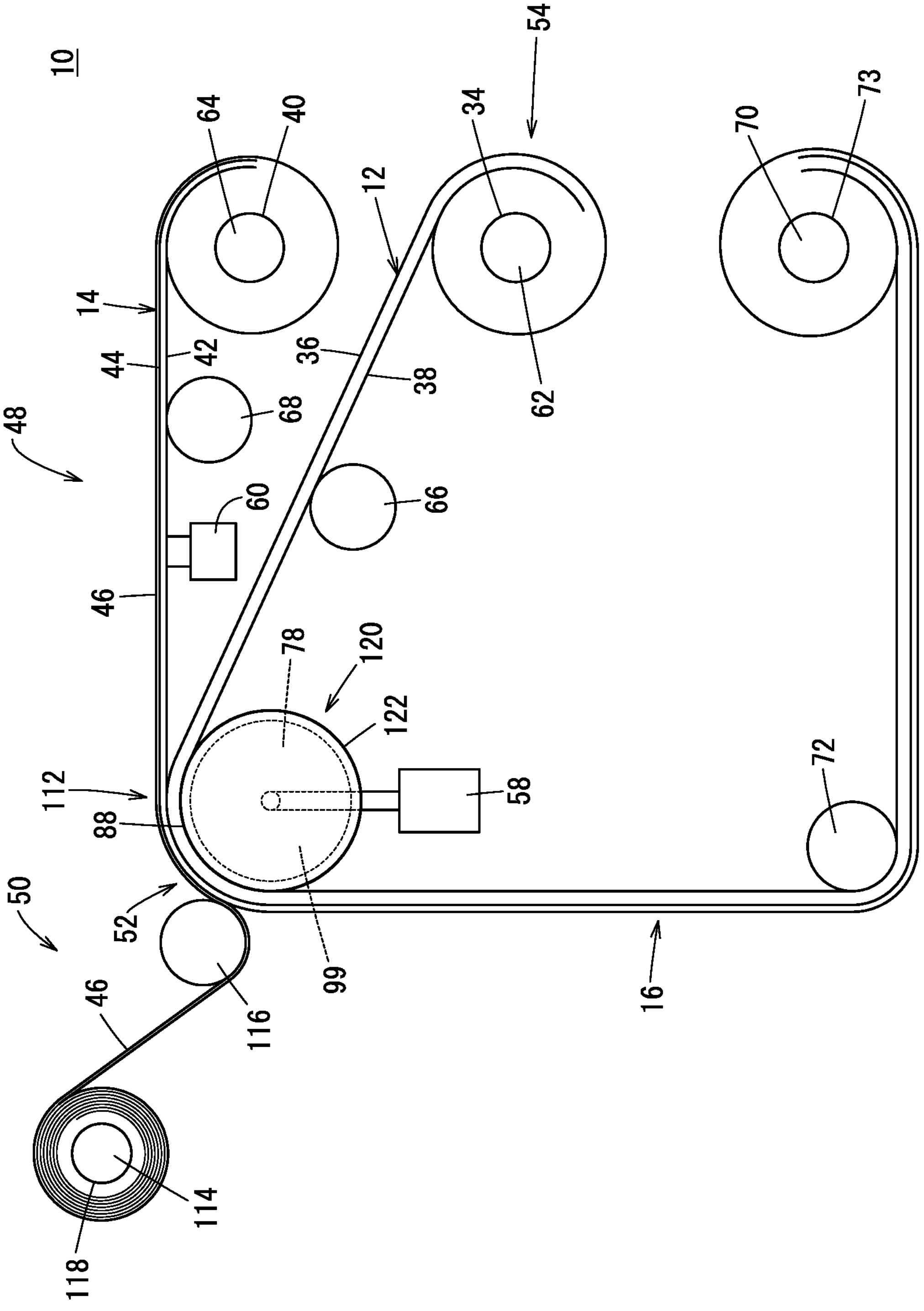
FIG. 7 is a schematic configuration diagram of a joined body manufacturing apparatus according to another modification.
Figure 8:
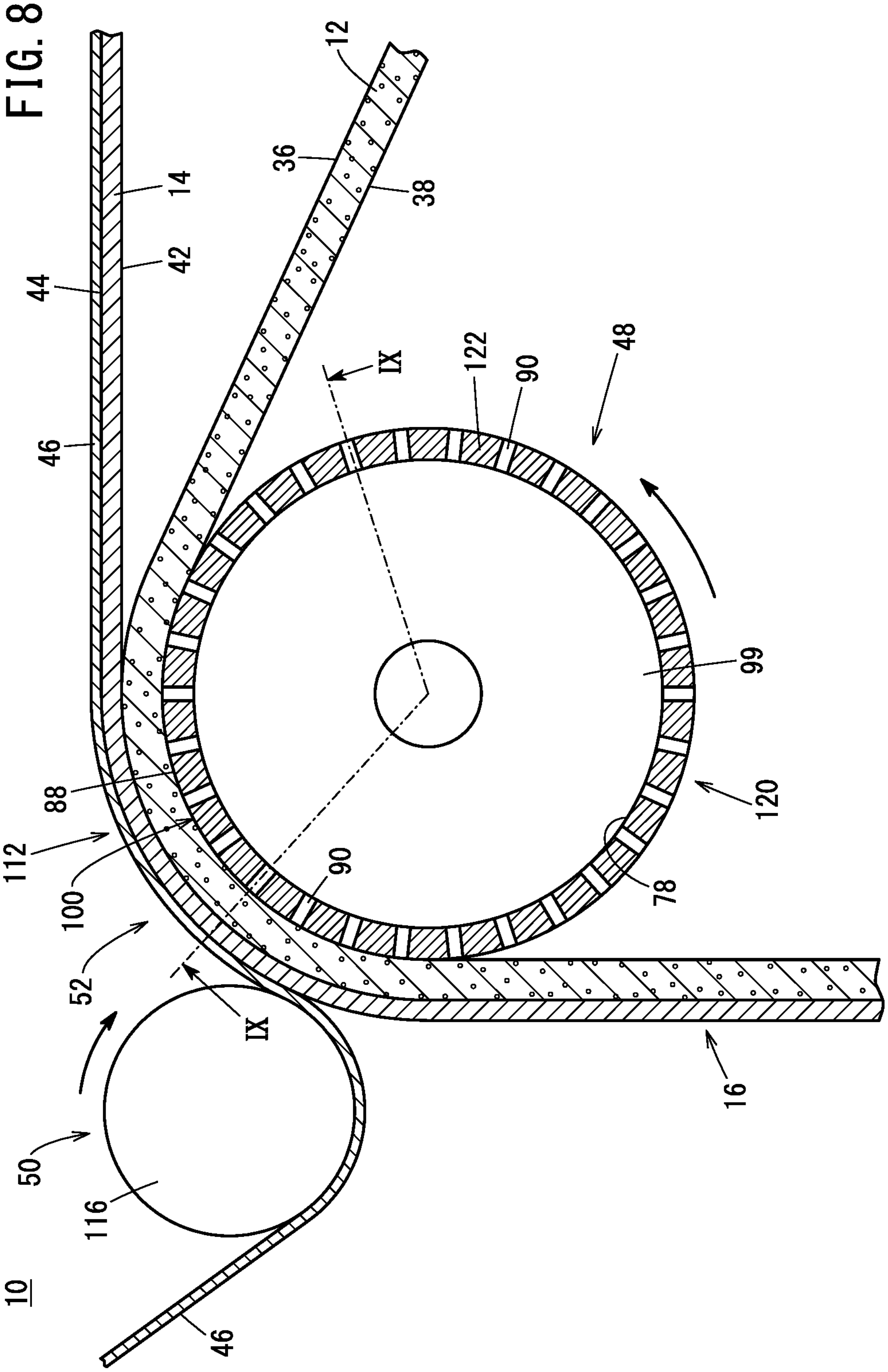
FIG. 8 is a cross-sectional view taken along the radial direction of a rotating unit of FIG. 7.
Figure 9:
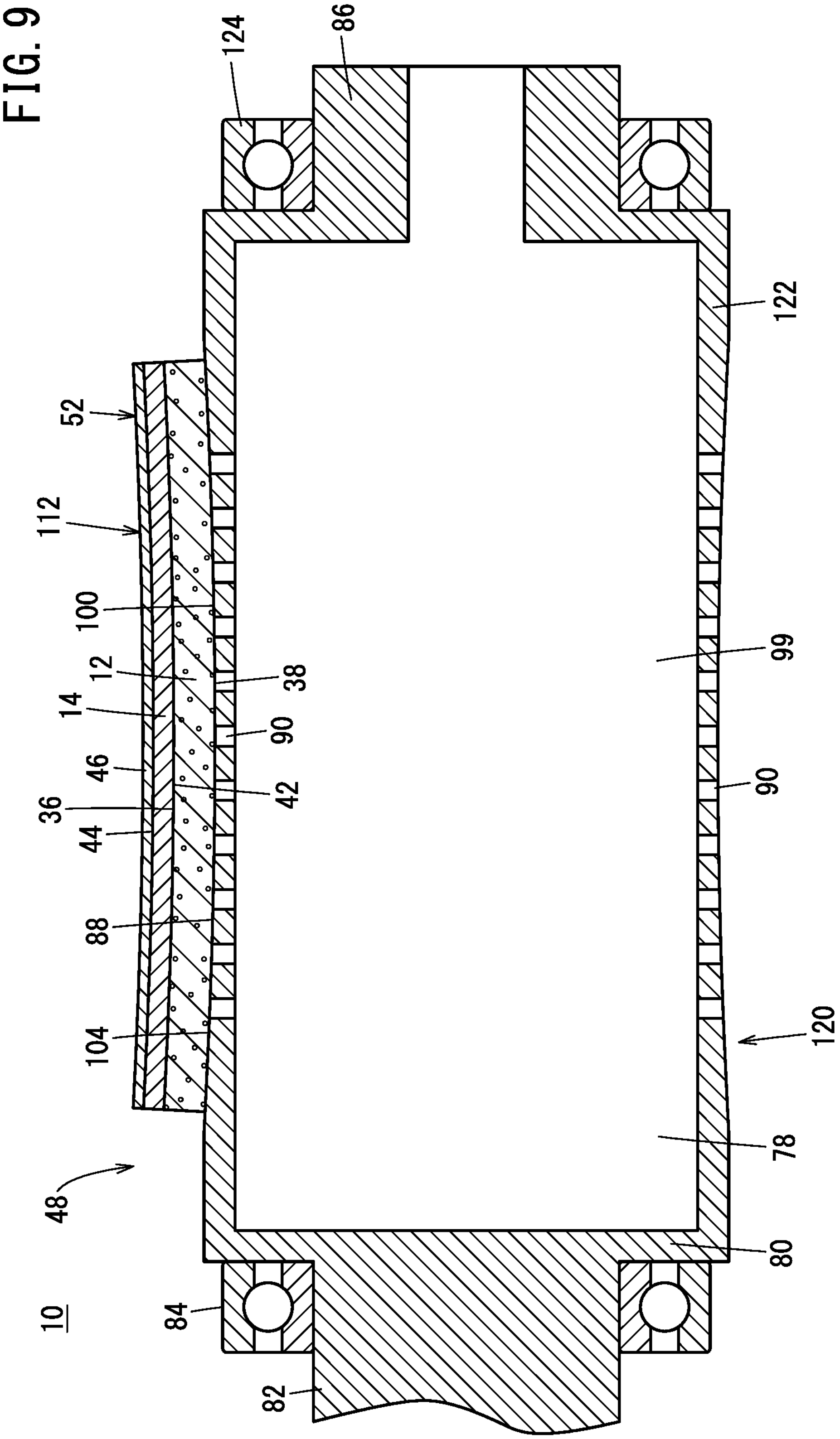
FIG. 9 is a cross-sectional view taken along line IX-IX of FIG. 8.

In the above-described embodiment, the rotating unit 56 includes the support shaft 76. However, for example, as illustrated in FIGS. 7 to 9, the joined body manufacturing apparatus 10 may include a rotating unit 120 that does not include the support shaft 76, instead of the rotating unit 56 of FIGS. 1 to 3. Hereinafter, differences between the rotating unit 120 of FIGS. 7 to 9 and the rotating unit 56 of FIGS. 1 to 3 will be mainly described.

The rotating unit main body 122 of the rotating unit 120 in FIGS. 7 to 9 is provided with a third bearing 124 on the outer periphery of the protruding portion 86. The rotating unit main body 122 is rotatably supported by a support mechanism (not shown) via the third bearing 124. The hollow portion 78 formed inside the rotating unit main body 122 communicates with the suction unit 58 via the inside of the protruding portion 86. Therefore, by the suction unit 58 suctioning the hollow portion 78, a negative-pressure portion 99 is generated in the entire hollow portion 78.

In the rotating unit main body 122, the through holes 90 are formed only in the central portion of the contact suction portion 88 in the axial direction. That is, the through holes 90 are formed only in the communication region 100 of the contact suction portion 88. The non-communication region 104 of the contact suction portion 88 does not have the through holes 90, and thus it does not communicate with the negative-pressure portion 99.

The heating chamber 106 of FIGS. 1 to 3 is not formed inside the hollow portion 78 of the rotating unit main body 122. Therefore, the heating unit 60 does not supply hot air to the heating chamber 106 of FIGS. 1 to 3. The heating unit 60 supplies hot air to the second layer 14 before reaching the rotating unit 120, at a position between the rotating unit 120 and the second unwinding roller 64, for example. Note that the hot air is preferably humidified. The heating unit 60 may heat the second layer 14 by using a heater or the like, instead of supplying hot air.

Also in the joined body manufacturing apparatus 10 of FIGS. 7 to 9 configured as described above, the suctioned portion 112 can be attracted to the contact suction portion 88 under suction, by the suction unit 58 creating a negative pressure in the hollow portion 78. Therefore, peeling of the first joined surface 36 and the second joined surface 42 can be suppressed even when the peeling unit 50 peels off the coating film 46 from the second back surface 44 and consequently the coating film 46 pulls the second layer 14 in a direction in which the second layer 14 is separated away from the first layer 12. As a result, the high-quality joined body 16 can be efficiently manufactured. In addition, the joined body manufacturing apparatus 10 of FIGS. 7 to 9 does not have the support shaft 76 of FIGS. 2 and 3, and thus the configuration of the rotating unit 120 can be simplified.

What is claimed is:

1. A joined body manufacturing apparatus for manufacturing a joined body from a first layer that is porous and a second layer that is non-porous, wherein the first layer includes a first joined surface and a first back surface which is a surface opposite to the first joined surface, the second layer includes a second joined surface and a second back surface which is a surface opposite to the second joined surface, and a coating film is peelably attached to the second back surface, the joined body manufacturing apparatus comprising:

a roll conveying unit configured to continuously join the first joined surface and the second joined surface in a laminated state while conveying the first layer and the second layer, to form a film-attached joined body; and a peeling unit configured to peel the coating film from the second back surface of the film-attached joined body to obtain the joined body, wherein the roll conveying unit includes a rotating unit and a suction unit, an outer peripheral surface of the rotating unit includes a contact suction portion configured to make contact with the first back surface, the rotating unit rotates while bringing the contact suction portion into contact with the first back surface, the suction unit suctions the second layer from the contact suction portion through pores of the first layer, to thereby form a suctioned portion attracted to the contact suction portion under suction, in a laminated body of the first layer and the second layer, and the peeling unit peels the coating film from the second back surface of the suctioned portion of the film-attached joined body.

2. The joined body manufacturing apparatus according to claim 1, wherein the coating film continuously covers the second back surface, the peeling unit includes a guide member which is rotatably disposed at a position facing the suctioned portion on a side opposite to the rotating unit, and the guide member rotates in a direction opposite to a rotation direction of the rotating unit in a state where an outer peripheral surface of the guide member is in contact with the coating film.

3. The joined body manufacturing apparatus according to claim 1, wherein in the rotating unit, an outer diameter of a central portion of the contact suction portion in an axial direction thereof is smaller than outer diameters of both end portions of the contact suction portion in the axial direction, and in a cross section along an axial direction of the rotating unit, the contact suction portion is curved in a direction in which the central portion is recessed relative to the both end portions.

4. The joined body manufacturing apparatus according to claim 1, wherein the rotating unit includes a rotating unit main body having the outer peripheral surface, a hollow portion is formed inside the rotating unit main body, the rotating unit main body includes through holes that allow an inside and an outside of the hollow portion to communicate with each other, the suction unit generates a negative-pressure portion in at least a part of the hollow portion, and the suction unit forms the suctioned portion by using the negative-pressure portion and the through holes communicating with the negative-pressure portion.

5. The joined body manufacturing apparatus according to claim 4, wherein the contact suction portion of the rotating unit main body includes a communication region that communicates with the negative-pressure portion via the through holes and a non-communication region that does not communicate with the negative-pressure portion, the non-communication region is disposed outside each of both ends of the communication region in an axial direction of the rotating unit main body, and the first back surface of the suctioned portion is in contact with both the communication region and the non-communication region.

6. The joined body manufacturing apparatus according to claim 5, wherein the non-communication region does not have the through holes.

7. The joined body manufacturing apparatus according to claim 1, wherein the roll conveying unit includes a heating unit configured to heat and soften the second layer before the first joined surface and the second joined surface are joined to each other.

8. The joined body manufacturing apparatus according to claim 5, wherein the through holes are formed in both the communication region and the non-communication region, the rotating unit includes a support shaft configured to rotatably support the rotating unit main body, the support shaft includes an insertion portion disposed inside the hollow portion, a portion of the insertion portion that faces the communication region forms a suction chamber in the hollow portion, the suction unit generates the negative-pressure portion by creating a negative pressure in the suction chamber, and a portion of the insertion portion that faces the non-communication region blocks communication between the suction chamber and the through holes disposed in the non-communication region.

9. The joined body manufacturing apparatus according to claim 8, wherein the roll conveying unit includes a heating unit configured to heat and soften the second layer before the first joined surface and the second joined surface are joined to each other, the insertion portion forms a heating chamber in the hollow portion, separately from the suction chamber, the heating chamber is disposed at a position separating away from the suction chamber in a direction opposite to a rotation direction of the rotating unit main body, the heating unit supplies hot air to the heating chamber, and the hot air supplied to the heating chamber is discharged from the heating chamber through the through holes, to thereby heat the second layer through the pores of the first layer.

* * * * *